(12) United States Patent
Pena (10) Patent No.: US 6,416,308 B1
(45) Date of Patent: Jul. 9, 2002

(54) SYSTEM FOR IDENTIFYING AND REJECTING DEFECTIVE BLOW-MOLDED PLASTIC PRODUCTS

(75) Inventor: Victor M. Pena, Houston, TX (US)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 0 days.

(21) Appl. No.: 09/498,690

(22) Filed: Feb. 7, 2000

(51) Int. Cl.[7] .......................... B29C 49/36; B29C 49/80
(52) U.S. Cl. ...................... 425/169; 425/215; 425/522; 425/540
(58) Field of Search ................... 425/169, 215, 425/522, 540

(56) References Cited

U.S. PATENT DOCUMENTS

| | | | |
|---|---|---|---|
| 4,351,663 A | * 9/1982 | Wood | 65/66 |
| 4,427,360 A | 1/1984 | Albrecht et al. | 425/541 |
| 4,943,228 A | 7/1990 | Reymann et al. | 425/526 |
| 5,139,406 A | * 8/1992 | Hoshino et al. | 425/522 |
| 5,244,610 A | * 9/1993 | Kitzmiller | 425/540 |
| 5,683,729 A | 11/1997 | Valles | 425/526 |
| 5,792,491 A | 8/1998 | Chaure | 425/535 |
| 5,863,571 A | 1/1999 | Santais et al. | 425/526 |
| 5,968,560 A | 10/1999 | Briere et al. | 425/192 R |
| 5,988,416 A | 11/1999 | Cheng et al. | 215/375 |
| 6,186,760 B1 | * 2/2001 | Latham | 425/540 |

FOREIGN PATENT DOCUMENTS

| | | | | |
|---|---|---|---|---|
| GB | 2169552 A | * | 7/1986 | 425/169 |
| JP | 62275731 A | * | 11/1987 | |
| JP | 03278936 A | * | 12/1991 | |
| JP | 04298322 A | * | 10/1992 | |

OTHER PUBLICATIONS

Sound Flow Sensor Model AF10 (by Nohken Inc.) Installation Manual (1994).

* cited by examiner

Primary Examiner—Robert Davis
(74) Attorney, Agent, or Firm—Woodcock Washburn LLP (57) ABSTRACT

A system and method for detecting and rejecting defective blow molded containers is provided. The invention includes a sound detector system for sensing the sound level from a mold during the blowing process, and outputting a sound level signal. If the sound level signal exceeds a predetermined set point, thereby indicating a discontinuous container, a kick mechanism rejects the defective container. The kick mechanism is sequenced with the sound detector system. A proximity switch may be employed to indicate the mold being in position in front of the sound detector.

35 Claims, 5 Drawing Sheets

SYSTEM FOR IDENTIFYING AND REJECTING DEFECTIVE BLOW-MOLDED PLASTIC PRODUCTS

BACKGROUND

This invention relates to systems and methods for producing blow-molded plastic articles, and more particularly, for identifying and rejecting defective blow-molded plastic products during the process of making blow-molded plastic products.

Blow molding of containers and other products is a well-known process in which a heated thermoplastic preform is loaded into a mold and filled with pressurized blow air to expand the preform to the shape of the mold interior surface. For example, U.S. Pat. No. 5,683,729, entitled "Apparatus for Making Containers by Blow Moulding Plastic Parisons;" U.S. Pat. No. 5,863,571, entitled, "Machine for Making Containers by Blow Moulding Plastic Parisons:" U.S. Pat. No. 4,427,360, entitled "Apparatus for blow Molding Plastic Articles from a Parison;" and U.S. Pat. No. 4,943,228, entitled, "Blow Molding Machine," illustrate an injection blow molding process for containers. Each of these patents are incorporated herein by reference in their entireties.

The air pressure within the preform may begin at about 75 pounds per square inch ("PSI") and reach approximately 550 PSI during the active blow stage. The molds typically have small vents near the split lines and/or near the base to permit air to escape from the mold as the preform expands. U.S. Pat. No. 5,792,491, entitled, "Device for Sealing a Plastic Container Preform to a Blow Moulding Nozzle," which is incorporated herein by reference in its entirety, illustrates a mold for a container.

Even though the preform wall is designed to remain continuous throughout the blowing process to form a continuous container that holds the intended contents, holes or discontinuities in the wall of a finished container sometimes occur that render the container useless. Because such defective products often are not identified during an inspection process, the defective containers frequently may be shipped to a bottler, where the defective container produces leaks, as well as loss of product and production time. The trend toward decreasing weight and wall thickness of containers exacerbates the problem of discontinuities in the preform or container wall.

SUMMARY

A system for rejecting a defective discontinuous container from a container production line is provided. The system includes a blow molding carousel, a sound detector system, and a kick mechanism. The blow molding carousel comprises at least two molds such that each one the molds includes an interior surface corresponding to a shape of the container and a nozzle coupled to the carousel and disposed proximate an opening in said mold. Each one of the molds receives pressurized blow air into the mold through the nozzle. The carousel includes a preform-loading point and a container-unloading point, and may also include a container transfer wheel for transferring a plurality of the containers from the carousel at the container-unloading point.

The sound detector system is an disposed proximate the carousel and outputs a reject signal upon sensing a blow air sound level exceeding a predetermined sound level set point (preferably in decibels). The kick mechanism ejects the discontinuous container in response to the reject signal being output from the sound detector. Preferably, the kick mechanism includes a reject arm that strikes the discontinuous container from the container transfer wheel to eject the discontinuous container therefrom. The sound detector system includes a device, which preferably is a proximity switch) for ascertaining a position of the mold from which blow air is escaping (that is, the mold that is creating the sound that exceeds the predetermined sound level set point).

Thus, a preform contiguously expands within the mold interior surface in response to the pressurized blow air to form the container. A failure of a wall of the preform or the container during expansion forms the discontinuous container having a hole through which the blow air flows to form the blow air sound level exceeding the predetermined sound level set point. The predetermined sound level set point is less than a sound level of the pressurized blow air flowing outwardly through the container hole and the mold.

The system may include a delay that sequences the actuation of the reject arm with a signal from said sound detector. The delay may be any suitable delay that achieves such sequencing, such as a time delay approximately equal to the time interval between the container moving from the sound detector to the reject arm or a preset number of pulses from a proximity switch approximately corresponding to the number of containers between the sound detector and the kick mechanism. A controller may control the sequencing, although any logic, including that in a microphone that senses the sound level, may be employed.

According to another aspect of the present invention, the sound detection system for identifying a defective discontinuous container from a container production line is provided that includes a microphone and a control system. The microphone: senses a sound level proximate a container mold and produces a signal that corresponds to the sound level. The sound level may varying according to whether pressurized blow air flows through the discontinuity and a vent in the container mold.

The control system, which is in communication with the microphone, receives the sound level signal and compares the sound level signal to a predetermined sound level set point. The control system outputs a reject signal in response to the sound level signal exceeding the predetermined sound level set point, which is less than a sound level signal corresponding to pressurized blow air flowing through the container mold vent.

The sound detection system may also include a proximity switch for sensing the position of the mold relative to the microphone, wherein the sound level system is activated in response to the proximity switch indicating that the mold is within a predetermined sensing range of the microphone and deactivated in response to the proximity switch indicating that the mold is outside of the predetermined sensing range. Further, the sound detection system may include a controller that compares the sound level signal to the predetermined set point. The controller generates a reject signal in response to the sound level signal exceeding the predetermined set point and delays generating the reject signal according to the predetermined interval.

According to another aspect of the present invention, a method for rejecting a defective discontinuous container from a container production line is provided that comprises the steps of: (a) sensing a sound level proximate a blow molding carousel comprising at least two molds such that each one of the molds includes an interior surface corresponding to a shape of the container and receives pressurized blow air into the mold; (b) generating a sound level signal that corresponds to the sound level; (c) comparing the sound level signal with a predetermined sound level set point; (d) generating a reject signal in response to the sound signal exceeding the predetermined set point; and (e) rejecting the discontinuous container from the production line in response to the reject signal. Thus, a preform contiguously expands within the mold interior surface in response to the pressurized blow air to form the container and a failure of a wall of the preform or the container during expansion forms the discontinuous container having a hole through which the blow air flows to form the blow air sound level exceeding the predetermined sound level set point.

Further, the method may include a deactivating step and an activating step. The activating step includes activating the method in response to the carousel being disposed in a first circumferential position. The deactivating step disables at least one of the sensing step (a), the generating step (b), the comparing step (c), the generating step (d), and the rejecting step (e) in response to the carousel being disposed in a second circumferential position. The deactivating step preferably may include deactivating at least one of the comparing step (d) and the generating step (d) in a controller. The generating step preferably may include delaying outputting the reject signal to sequence the rejecting step (e) with the sensing step (a). The sequencing step may include delaying the outputting of the reject signal, as described above. The generating step (b) may include may employ a controller.

DESCRIPTION OF A PREFERRED EMBODIMENT

Figure 1:
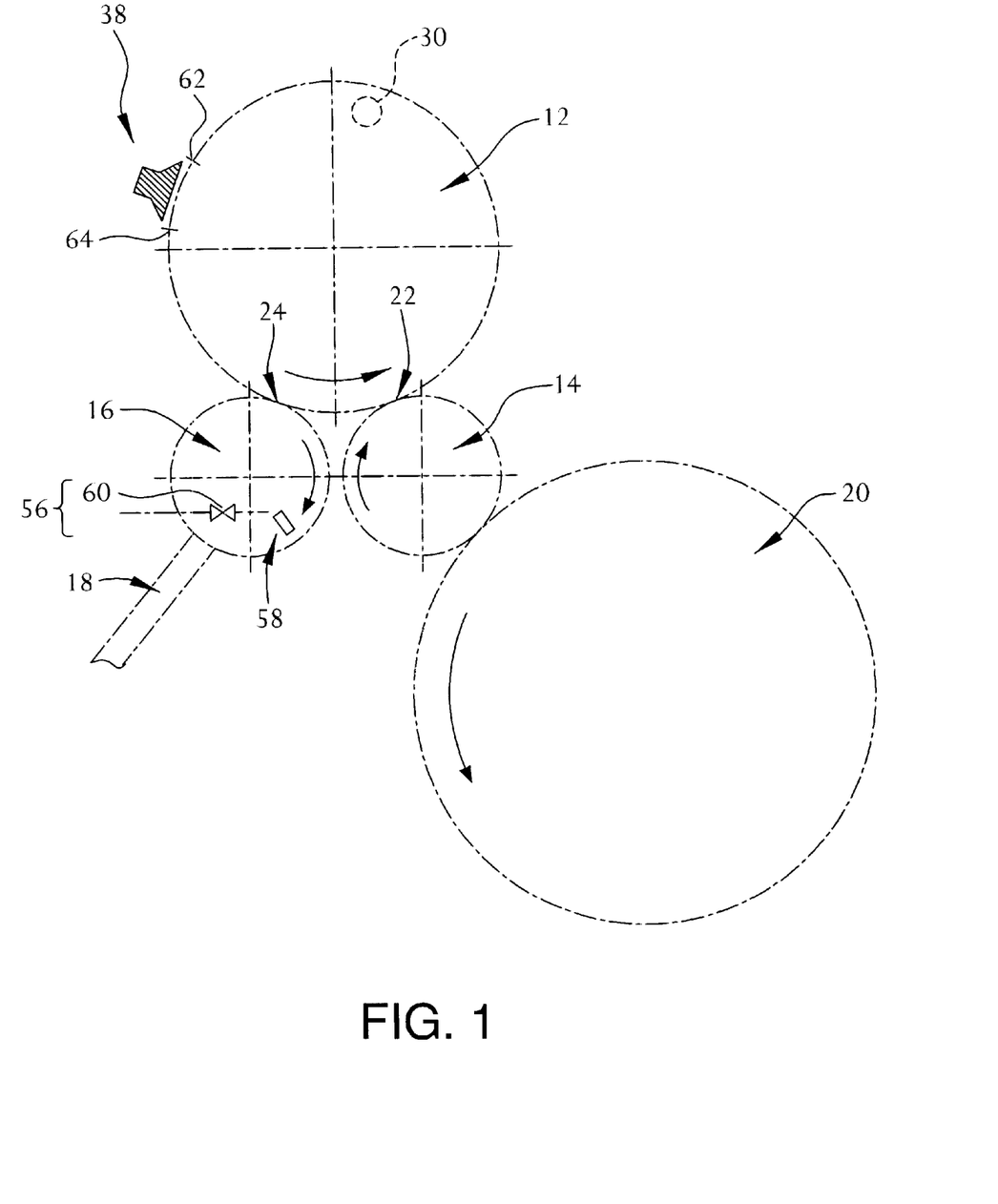
FIG. 1 is a schematic of a production line employing the system according to the present invention.

Referring to the Figures to illustrate an embodiment of the present invention, a production system for producing containers by blow-molding preforms is provided that rejects defective containers. Referring to FIG. 1, the container production system includes a blow molding carousel 12, a preform transfer wheel 14, a container transfer wheel 16, a conveyor 18, and a preform oven 20. The carousel 12 includes at least two molds for forming a plastic container therein. Preferably, carousel 12 includes several molds, such as twenty-four, that rotate with the carousel in a predetermined circular path.

Figure 5:
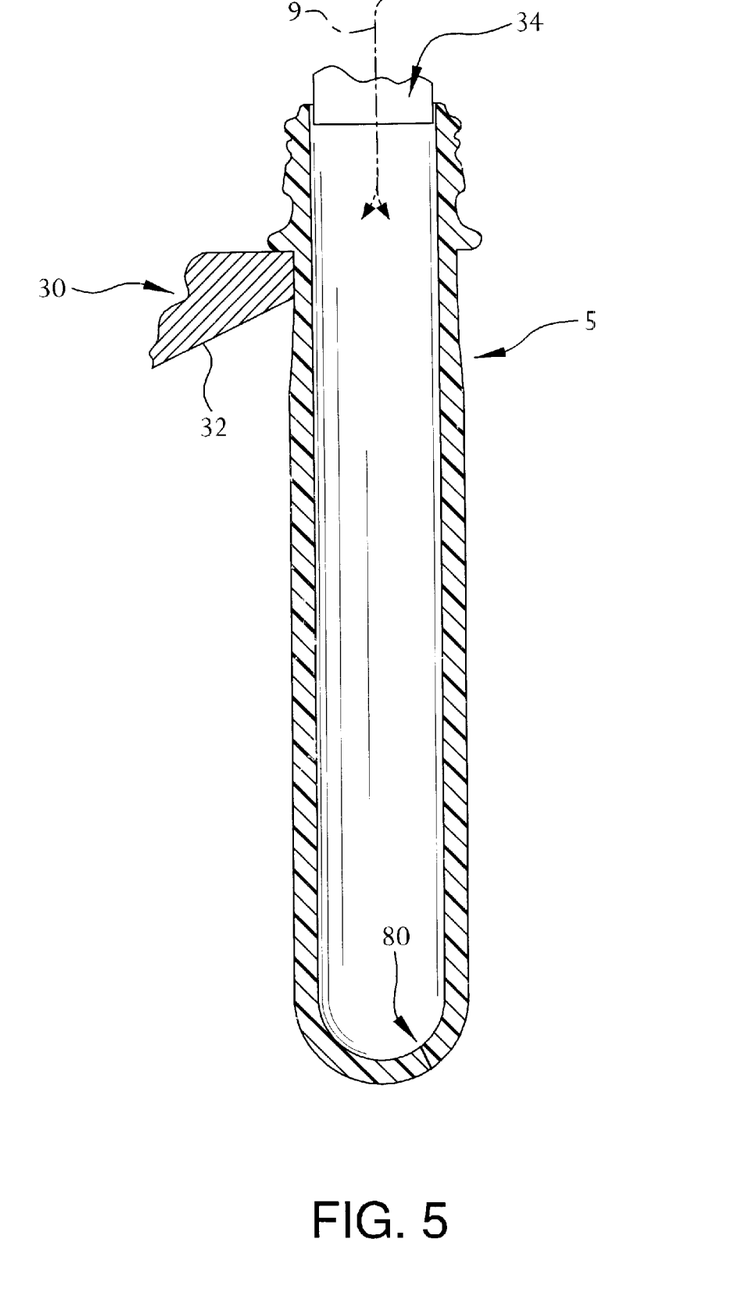
FIG. 5 is an enlarged sectional view of a preform for which the present invention may be employed.

A series of preforms 5, an example of which is shown in FIG. 5 (including a hole 8a that will form a corresponding hole in the container, thereby forming the discontinuous container), are conveyed along a defined path through oven 20 wherein heat is applied to the preform from a battery of heating elements, which typically are elongated infrared bulbs. At a preform-loading point 22, fingers (not shown) grip the preform 5 by the finish area and position the preform into an open mold, a portion of which is shown in FIG. 5. The fingers retract, and a blow nozzle 34 is inserted into the opening of the preform.

Figure 2:
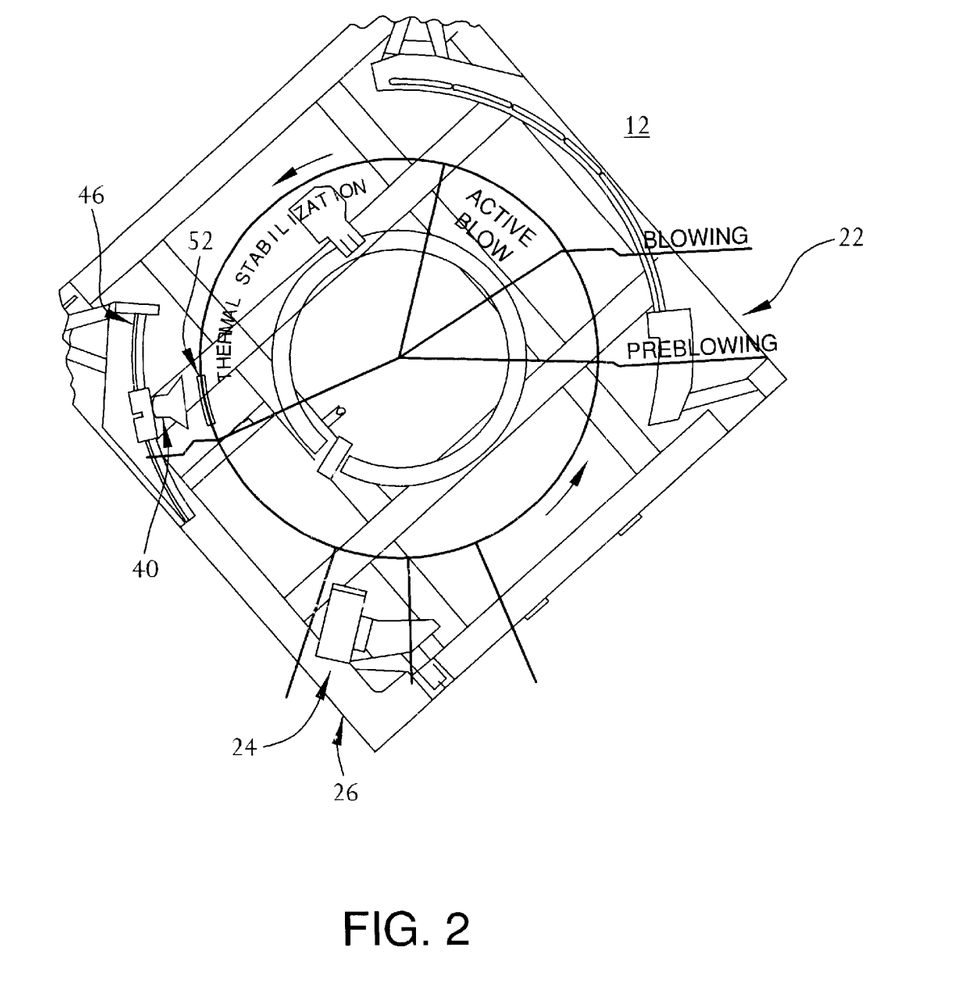
FIG. 2 is a top view of a portion of a blow molding carousel with aspects of the present invention shown in schematic.

Upon seating, pressurized blow air 9, shown schematically in FIG. 5, is introduced into the interior of the preform to expand preform 5. Optionally, a stretch rod (not shown) may drive the bottom surface of the preform until it impinges on the bottom of the mold (not shown). Referring to FIG. 2, the pre-blowing stage corresponds to stretching of the preform 5 by the stretch rod and the active blow stage corresponds to further expansion of the preform in the hoop direction. The blow air 9 preferably pressurizes the preform such that after the active blow stage, preform has expanded to the shape of the interior 34 of the mold. For example, the preform 5 may take the shape of a bottle 4, shown in FIG. 6, that is further described in U.S. Pat. No. 5,988,416, which is incorporated herein by reference in its entirety.

Figure 6:
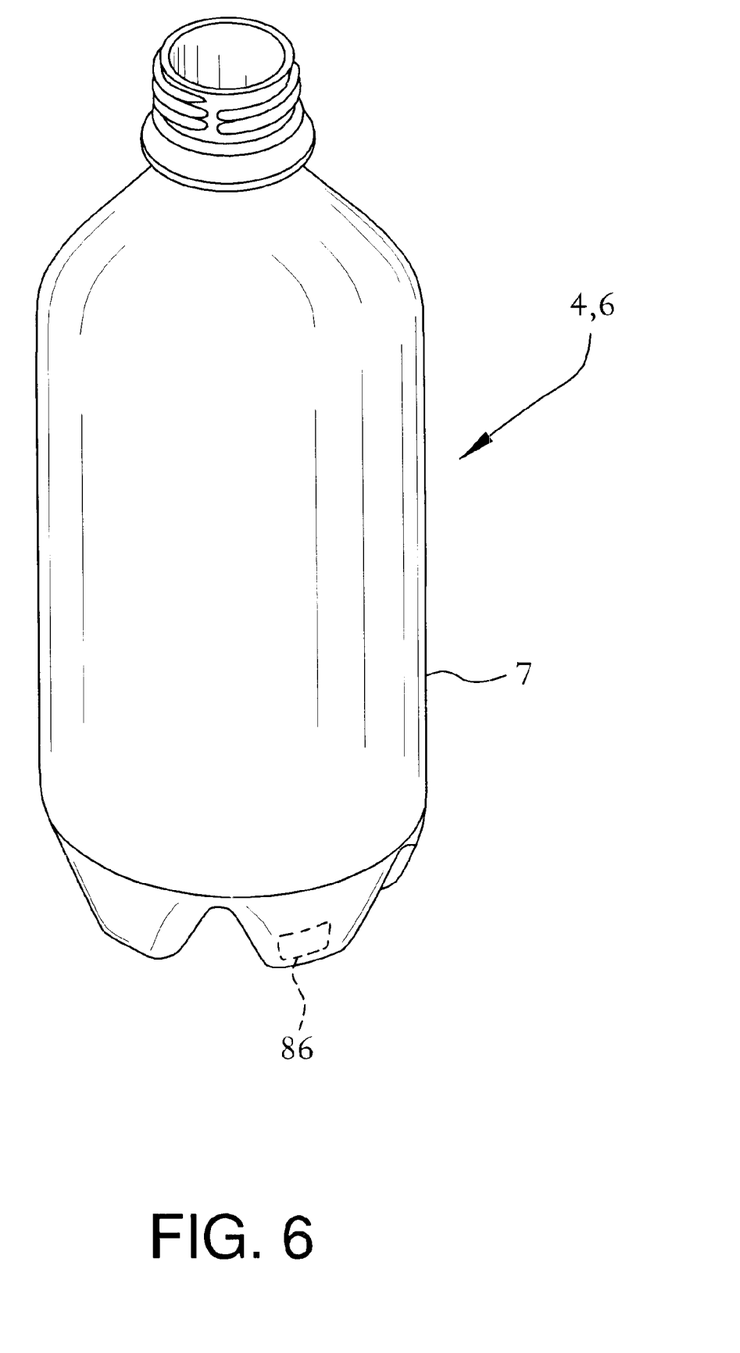
FIG. 6 is a perspective view of a container for which the present invention may be employed.

As shown in FIG. 5, preform 5 may include a small hole or wall discontinuity 8a. Referring to FIG. 6, bottle 4 has a sidewall 7 that preferably is continuous to form an acceptable container, but may include a discontinuity 8b (shown in phantom in FIG. 6), which may be caused by discontinuity 8a in the preform or some other defect in the preform, such as excessive crystallization or wall thickness or composition that is outside of the specified range, or simply improper and unanticipated stretching or expansion of the preform. Thus, the term "discontinuity" (and words formed from the same root word) encompasses a hole, crack or other aperture in any portion of the container, including the base and sidewall, through which air may escape. The reference numeral 4 will be employed to designate an acceptable, continuous container, while reference numeral 6 will be employed to designate a defective, discontinuous container (that is, a container with a sidewall having a discontinuity 8b).

Thus, at the end of the active blowing stage (that is, the most counter-clockwise point of the area identified as "active blow" in FIG. 2), the container 4,6 essentially has its final shape, as shown in FIG. 6. The container 4,6 continues counter-clockwise through a thermal stabilization stage in which cooling water flowing through the mold cools and stabilizes the material. Referring to FIG. 1, the containers 4,6 within the molds 30 continue moving to a container-unloading point 24, where the molds open and the containers are transferred from the carousel 12 to the container transfer wheel 16. The containers 4,6 are then transferred from the container transfer wheel 16 to a conveyor 18.

Referring to FIGS. 1, 2, 3, and 4, according to an aspect of the present invention, a sound detector system 38 is provided that includes a microphone 40 within a microphone housing 42. Microphone 40 may be any conventional microphone, including for example the piezo-electric element type such as Model AF10 Sound Flow Sensor supplied by Nohken, Inc. Alternatively, a microphone may be employed that weights components of the sound level to emphasize particular frequency ranges. The frequencies for weighting will vary according to the particular aspects of the application, and will depend on such factors as mold and vent design, frequency of the ambient noise, size of the hole to be sensed, and similar variables, as will be understood by persons familiar with blow-molding technology and sound detecting or measuring equipment.

Figure 3:
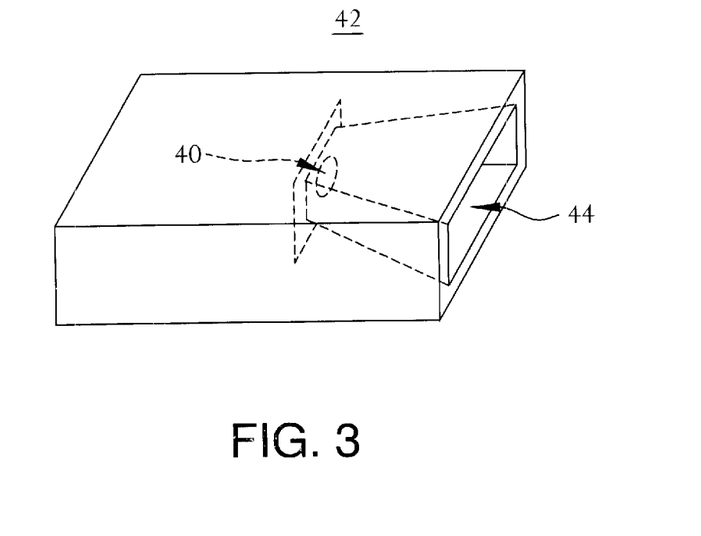
FIG. 3 is perspective view of a housing for enclosing a portion of the system according to the present invention.

Housing 42 may be a box or other-shape enclosure that houses microphone 40. Housing 42 may be formed of any conventional material, such as sheet metal, and preferably includes insulation surrounding most of the microphone 40 to inhibit ambient noise and vibration from reaching microphone 40. Housing 42 includes a housing inlet 44 which is directed toward the molds 30 of the carousel 12 to expose an inlet of the microphone 40 to the blow air exiting the molds 30. The housing 42 and microphone 40 preferably are mounted onto a slide 46 that enables the sound detector system 38 to moved circumferentially relative to carousel 12 to position the system 38 to fine tune its operation, as will be understood by persons familiar with sound detection principles.

Preferably, the microphone 40 is disposed relative to the carousel between 150 degrees and 210 degrees from the preform-loading point 22. Even more preferably, microphone 40 is disposed approximately 180 degrees from the preform-loading point 22 in order to sense the sound level from the mold 30 based on a substantially fully formed container 4,6. Preferably, an acoustical enclosure surrounds the carousel 12 and sound detector system 38 to diminish the ambient sound reaching microphone 40.

Referring to another aspect of the present invention, a proximity switch 52 is provided. Preferably, switch 52 is disposed circumferentially in-line (that is, at the same radial position relative to carousel 12) with microphone 40. Switch 52 preferably substantially senses the presence or absence of the mold along the arc length of one mold such that switch senses the presence or absence of a mold 30 in front of microphone 40. Thus, switch 52 outputs a first value upon the carousel reaching a first position 62 that corresponds to a leading edge of a mold passing in front of microphone 40 and outputs a second value upon the carousel reaching a second position 64 that corresponds to a trailing edge of the mold passing in front of the microphone 40. Specifically, for example, switch 52 may be a conventional proximity sensor that is positioned vertically above the microphone.

Further, first and second carousel positions 62 and 64 may be varied according to the desired span for which microphone 40 will be activated. Under particular circumstances, it may be desirable for the microphone 40 to be activated for a very short period relative to the mold width. For example, in circumstances in which holes 8b are relatively large such that the sound level has a high magnitude, the proximity switch may be set to provide an interval within which the sound detector system 38 is activated equal to one eighth of the width of the mold. Thus, the sound detector system 38 may be less likely to pick up an ambient sound, including pressurized blow air flowing from a mold 30 that is one or more molds away from the microphone, thereby diminishing the false identification of a continuous container 4.

The switch 52 may be in a normally open position, and switch to a closed position upon sensing that the mold 30 is disposed directly in front of microphone 40. Upon mold 30 moving away from switch 52 and microphone 40, switch 52 may return to its normally open state. Alternatively, a pair of limit switches (not shown) may be employed in which the first limit switch indicates that the mold leading edge is in position (that is, the first position 62) and the second limit switch indicates that the mold trailing edge is in position (that is, the second position 64). Specifically, a first of the two limit switches may be disposed at first position 62 and set to trigger upon contacting leading edge of mold 30. A second of the two limit switches may be disposed at the second position 64 and set to trigger upon contacting the trailing edge of mold 30. Other techniques and devices for ascertaining the position of the mold 30 relative to microphone 40 will be apparent to persons familiar with such techniques and devices in light of the present specification.

According to another aspect of the present invention, a control system 48 is provided that may be a conventional programmable logic controller or part of a larger control system. The control system 48 preferably is in electronic communication with the sound detector system 38 and the proximity sensor 52. The system also includes a conventional kick mechanism 56 that includes a reject arm 58 that strikes a container 6 to eject it from the production line. Preferably, the kick mechanism is a pneumatic system that is controlled by an air valve 60. Preferably reject arm 58 is disposed on the transfer wheel 16 between the container-unloading point and the conveyor 18. Alternatively, the kick mechanism 56 may be disposed on the carousel 12 (this configuration is not shown). The kick mechanism 56 may be of the type that is supplied by the carousel manufacturer.

The operation of the system will be described in conjunction with a description of the method according to an aspect of the present invention. A method is provided for rejecting a defective discontinuous container 6 from a production line, which is as described above. As mold 30 passes to first position 62, proximity switch 52 activates the sound detector system 38 such that microphone 40 is activated. As mold 30 passes to second position 64, proximity switch deactivates the sound detector system 38. Proximity switch 52 may be in communication with controller 48 in order to deactivate the sound detector system 38 (that is, the sound detector system 38 outputs a signal to the controller which does no further processing of the signal based on the signal from switch 52) or switch 52 may be in direct communication with electronics in the microphone 40 (that is, if the microphone has the logic circuit that can suppress its output based on the signal from switch 52).

Figure 4:
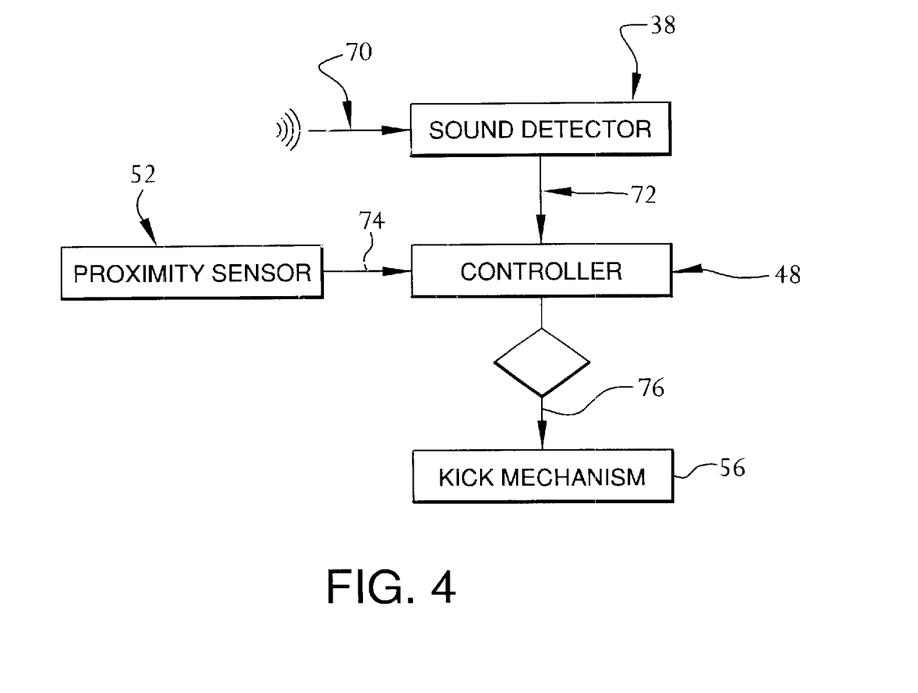
FIG. 4 is a flow diagram illustrating schematically illustrating aspects of the present invention.

Referring particularly to FIG. 4, a sound level 70 is sensed by the microphone 40. While the proximity switch 52 indicates the presence of a mold 30, microphone 40 outputs a sound level signal 72 to controller 48. Controller 48 compares the sound level signal 72 to a predetermined sound level set point, which corresponds to a sound level that is less than the sound level of pressurized blow air escaping through a hole 8b in the container wall 7, but greater than the sound level at normal operation of the production line. Thus, if the sound level signal 72 is greater than the predetermined set point (which is indicated in FIG. 4 as a decision block), it indicates that the container is defective because of a discontinuity therein.

As will be understood by persons familiar with blow-molding processes, the predetermined set point may be determined empirically according to the particular aspects of the application. For example, a small hole (for example one-sixteenth inch diameter) in the container 6 may provide a low sound level that is difficult to distinguish from background noise. In contrast, a large hole provides a high sound level such that the set point may be set well above the ambient noise level. Setting the sound level set point at a low magnitude to identify holes 8b that are small may falsely identify some sound levels as indicating a defective discontinuous container 6. Conversely, setting the sound level set point at a relatively high magnitude to identify holes 8b that are relatively large may not identify the sound level corresponding to relatively small holes 8b. Thus, the set point may be set according to the preferred trade-off between adequately identifying defective containers or products and falsely identifying acceptable products as defective.

Further, the disabling of the system by the proximity switch 52 diminishes the frequency of falsely identifying an acceptable product as defective because, for example, if a short term ambient sound level occurs that is above the predetermined set point while the proximity switch 52 senses that there is no mold 30 in position between first and second positions 62 and 64, then the sound detector system/control system will not send a reject signal 76. If the controller 48 determines that the sound level signal 72 is greater than the predetermined set point, controller 48 generates a reject signal 76, which for example may open valve 60 to actuate reject arm 58 to eject the defective container 6 or product from the transfer wheel 16 before the defective container or product reaches the conveyor.

Because the reject arm 58 is preferably spaced apart from microphone 40, the controller 48 preferably sequences the actuation of reject arm 58 with the sound level signal 72 that exceeds the predetermined set point. The sequencing may be achieved by delaying the outputting of the reject signal 76 by a time interval approximately equal to the time that the defective container 6 takes to move from in front of the proximity switch 52 to the reject arm 58. Preferably, the sequencing is achieved by delaying the outputting of the reject signal approximately by a preset number of pulses from a proximity switch approximately corresponding to the number of containers between the microphone and the reject arm.

Aspects of the present invention is illustrated by employing particular embodiments. However, the present invention is not limited thereto, and reference should be made to the claims to ascertain the scope of the invention. Particularly, the present invention is not limited to the particular containers shown and described, but may be employed with any blow-molded product. Further, even though an injection blow molding process is used to illustrate the invention, the present invention encompasses extrusion blow molding and other blow molding techniques, including a linear production line, as will be understood by persons familiar with those techniques in light of the present disclosure. Further, the components provided herein are for illustration purposes, and the present invention is not limited to the particular components or systems explicitly described herein.

I claim:

1. A system for rejecting a defective discontinuous container from a container production line, the system comprising:
    a blow molding carousel comprising at least two molds, each one of the at least two molds including an interior surface corresponding to a shape of the container and a nozzle coupled to the carousel and disposed proximate an opening in said mold, the carousel including a preform-loading point and a container-unloading point, each one of the molds receiving pressurized blow air into the mold through the nozzle;
    a proximity switch that senses a position of any one of the molds of the carousel, the proximity sensor fixed relative to the carousel;
    a sound detector system that outputs a reject signal upon sensing a blow air sound level exceeding a predetermined sound level set point, the sound detector is activated in response to any one of the molds of the carousel being disposed at a first position relative to the proximity switch and is deactivated in response to said any one of the molds of the carousel being disposed at a second position relative to the proximity switch; and
    a kick mechanism that ejects the discontinuous container in response to the reject signal being output from the sound detector,
wherein the carousel is rotatable and the sound detector includes a microphone that is disposed between 150 degrees and 210 degrees from the preform-loading point relative to the carousel, whereby a preform contiguously expands within the mold interior surface in response to the pressurized blow air to form the container and a failure of a wall of the preform or the container during expansion forms said discontinuous container having a hole through which the blow air flows to form the blow air sound level exceeding the predetermined sound level set point.

2. The system of claim 1 wherein the predetermined sound level set point is less than a sound level of the pressurized blow air flowing outwardly through the container hole and the mold.

3. The system of claim 1 further comprising a container transfer wheel for transferring a plurality of the containers from the carousel at the container-unloading point, said kick mechanism disposed on the container transfer wheel.

4. The system of claim 1 wherein the kick mechanism includes a reject arm that strikes the discontinuous container from the container transfer wheel to eject the discontinuous container therefrom.

5. The system of claim 4 wherein the reject arm is actuated based on a signal from said sound detector after a time delay approximately equal to the time interval between the container moving from the sound detector to the reject arm such that the operation of the reject arm is sequenced with the sound detector.

6. The system of claim 4 wherein the reject arm is actuated based on a signal from said sound detector after a preset number of pulses from a proximity switch approximately corresponding to the number of containers between the sound detector and the kick mechanism such that the operation of the reject arm is sequenced with the sound detector, the proximity switch sensing the presence or absence of a mold at a position proximate the carousel.

7. The system of claim 4 wherein the kick mechanism includes a controller receiving a sound level signal from the sound detector and outputting a reject signal in response to the sound signal exceeding the predetermined set point.

8. The system of claim 7 wherein the controller outputs the reject signal after an interval to sequence the sound detector with the reject arm.

9. The system of claim 8 wherein the kick mechanism includes a valve that opens in response to receiving the reject signal.

10. The system of claim 9 wherein the valve is a pneumatic valve and the reject arm is air actuated.

11. The system of claim 1 wherein the proximity switch is circumferentially aligned with the sound detector relative to the carousel.

12. The system of claim 1 wherein the microphone is disposed approximately 180 degrees from the preform-loading point relative to the carousel.

13. The system of claim 1 further comprising a preform transfer wheel for transferring a preform to the carousel at the preform-loading point.

14. The system of claim 1 wherein the kick mechanism ejects the discontinuous container from the carousel between the preform-loading point and the container-unloading point.

15. The system of claim 1 wherein the pressurized blow air is applied substantially between the preform-loading point and the container-unloading point.

16. The system of claim 1 wherein the sound detector system includes a sound detector microphone housing having an inlet that is directed to the mold.

17. A system for rejecting a defective discontinuous container from a container production line, the system comprising:
    a blow molding carousel comprising at least two molds, each one of the at least two molds including an interior surface corresponding to a shape of the container and a nozzle coupled to the carousel and disposed proximate an opening in said mold, the carousel including a preform-loading point and a container-unloading point, each one of the molds receiving pressurized blow air into the mold through the nozzle;

a sound detector system that outputs a reject signal upon sensing a blow air sound level exceeding a predetermined sound level set point;

an acoustical enclosure substantially surrounding the carousel and the sound detector; and a kick mechanism that ejects the discontinuous container in response to the reject signal being output from the sound detector, whereby a preform contiguously expands within the mold interior surface in response to the pressurized blow air to form the container and a failure of a wall of the preform or the container during expansion forms said discontinuous container having a hole through which the blow air flows to form the blow air sound level exceeding the predetermined sound level set point.

18. The system of claim 1 wherein mold includes vents through which blow air escapes while the mold houses the discontinuous container.

19. A sound detection system for identifying a defective discontinuous container from a container production line, the sound detection system comprising:

a microphone for sensing a sound level proximate a container mold of the production line, the sound level varying according to whether pressurized blow air flows through a vent in the container mold; the microphone providing a sound level signal;

a control system in communication with the microphone, the control system receiving the sound level signal and comparing the sound level signal to a predetermined sound level set point, the control system outputting a reject signal in response to said sound level signal exceeding the predetermined sound level set point, the sound level set point being less than a sound level signal corresponding to pressurized blow air flowing through the container mold vent; and a proximity switch for sensing the position of the mold relative to the microphone, wherein the sound level system is activated in response to the proximity switch indicating that the mold is within a predetermined sensing range of the microphone and deactivated in response to the proximity switch indicating that the mold is outside of the predetermined sensing range.

20. The sound detection system of claim 19 further comprising a controller that compares the sound level signal to the predetermined set point, the controller generating a reject signal in response to the sound level signal exceeding the predetermined set point, the controller delaying generating the reject signal according to a predetermined interval.

21. The sound detection system of claim 20 whereby a preform contiguously expands within the mold in response to a pressurized blow air to form the container, and a failure of a wall of the preform or the container during expansion forms the discontinuous container having a passage through which the blow air flows to form the blow air sound level signal exceeding the predetermined sound level set point.

22. The system of claim 17 wherein the predetermined sound level set point is less than a sound level of the pressurized blow air flowing outwardly through the container hole and the mold.

23. The system of claim 17 further comprising a container transfer wheel for transferring a plurality of the containers from the carousel at the container-unloading point, said kick mechanism disposed on the container transfer wheel.

24. The system of claim 17 wherein the kick mechanism includes a reject arm that strikes the discontinuous container from the container transfer wheel to eject the discontinuous container therefrom.

25. The system of claim 24 wherein the reject arm is actuated based on a signal from said sound detector after a time delay approximately equal to the time interval between the container moving from the sound detector to the reject arm such that the operation of the reject arm is sequenced with the sound detector.

26. The system of claim 24 wherein the reject arm is actuated based on a signal from said sound detector after a preset number of pulses from a proximity switch approximately corresponding to the number of containers between the sound detector and the kick mechanism such that the operation of the reject arm is sequenced with the sound detector, the proximity switch sensing the presence or absence of a mold at a position proximate the carousel.

27. The system of claim 24 wherein the kick mechanism includes a controller receiving a sound level signal from the sound detector and outputting a reject signal in response to the sound signal exceeding the predetermined set point.

28. The system of claim 27 wherein the controller outputs the reject signal after an interval to sequence the sound detector with the reject arm.

29. The system of claim 17 further comprising a proximity switch that senses a position of any one of the molds of the carousel, the proximity switch fixed relative to the carousel.

30. The system of claim 29 wherein the sound detector is activated in response to any one of the molds of the carousel being disposed at a first position relative to the proximity switch and is deactivated in response to said any one of the molds of the carousel being disposed at a second position relative to the proximity switch.

31. The system of claim 30 wherein the proximity switch is circumferentially aligned with the sound detector relative to the carousel.

32. The system of claim 29 wherein the carousel is rotatable and the sound detector includes a microphone that is disposed between 150 degrees and 210 degrees from the preform-loading point relative to the carousel.

33. The system of claim 32 wherein the microphone is disposed approximately 180 degrees from the preform-loading point relative to the carousel.

34. The system of claim 17 wherein the sound detector system includes a sound detector microphone housing having an inlet that is directed to the mold.

35. The system of claim 17 wherein mold includes vents through which blow air escapes while the mold houses the discontinuous container.

* * * * *